Jan. 2, 1951      E. R. KOONZ      2,536,376
TOOLHOLDER
Filed Feb. 5, 1947
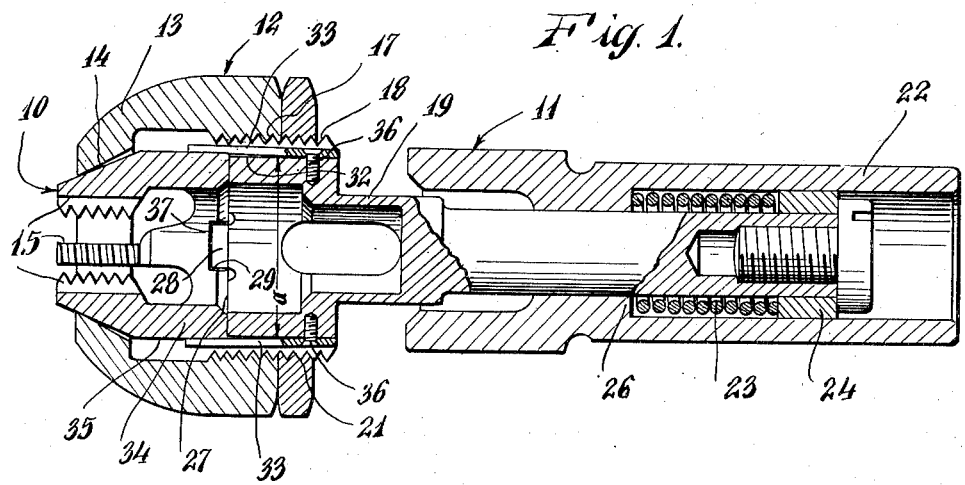
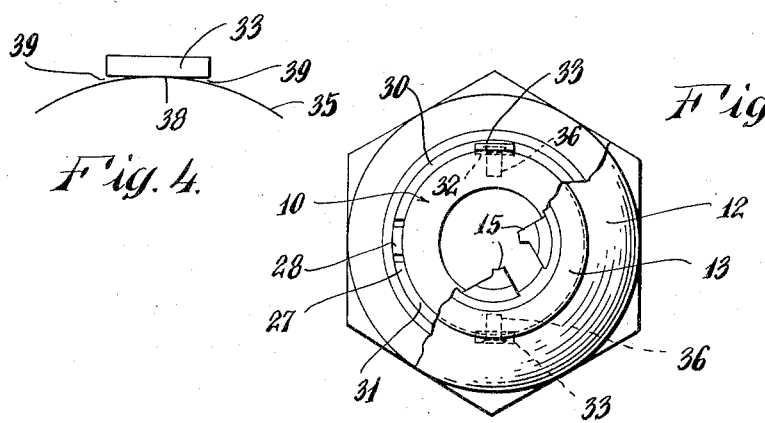
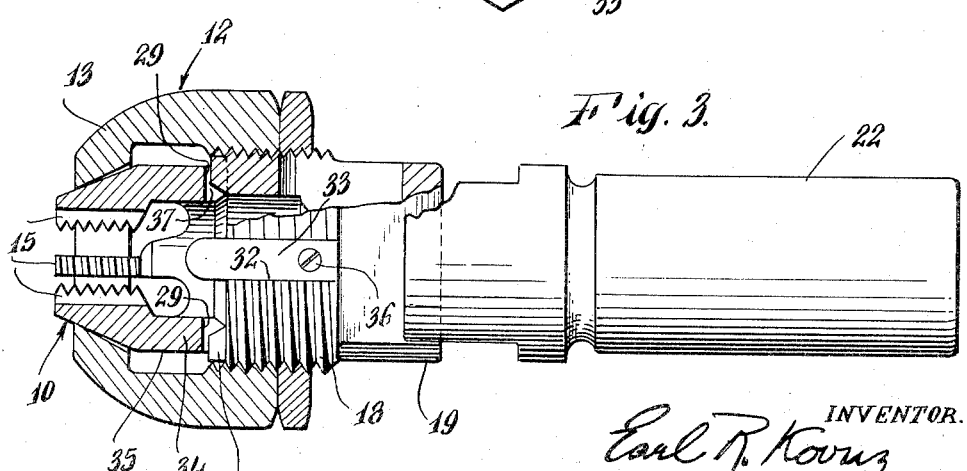
INVENTOR.
Earl R. Koonz
BY Frank A. Bauer
ATTORNEY.

Patented Jan. 2, 1951

2,536,376

UNITED STATES PATENT OFFICE 2,536,376

TOOLHOLDER

Earl R. Koonz, Greenfield, Mass., assignor to Greenfield Tap and Die Corporation, Greenfield, Mass., a corporation of Massachusetts Application February 5, 1947, Serial No. 726,482

2 Claims. (Cl. 279—56)

This invention relates to improvements in chucks for dies, die adapters, hollow mills and similar tools which are held in a chuck during use.

An object of this invention is to provide for the gripping of the tool in place on its chuck in the absence of, or before the fastening on of, a retaining cap.

A further object of the invention is the provision of convenient, unobtrusive and durable means for holding the tool on the chuck in the absence of a retaining cap and a minimum of stress and wear of the holding means during the operation of the tool.

Other objects including the particular construction, arrangement and combination of parts will appear from the following description taken together with the drawings in which:

Fig. 1 is a longitudinal central section of a die held on a chuck;

Fig. 2 is an end view of the die on the chuck showing the cap and die partially in section;

Fig. 3 is a plan view of the die and chuck showing the cap and die in section and the head partially in section; and Fig. 4 is an enlarged section of portions of the die and chuck at a point of contact.

As shown in Fig. 1 the invention is applied to a holder for a die. A threading device is shown comprising a threading die 10 seating against a chuck 11 and held by a cap 12 fastened to the chuck 11 and having an upper annular portion 13 with a tapered bore 14 which embraces lands 15 of the die 10. Cap 12 is fastened to the chuck 11 by internal threads 17 on the cap 12 which engages a threaded portion 18 of the chuck 11. By turning the cap 12 on the threaded portion 18 the annular portion 13 presses the die 10 onto its seat on the chuck 11.

The chuck 11 comprises a body 19 having a head 21 on which the threaded portion 18 is formed. The body 19 extends into and slides longitudinally in a tubular shank 22. A spring 23 held in compression between a collar 24 and a restricted portion 26 of the shank 22 tends to retain the body 19 within the shank 22. The end of head 21 at 27 forming a ring as shown in Fig. 2 is ground to a finish and provided with tongues 28. The die 10 rests against the end 27 and grooves 29 in the base of the die 10 receive the tongues 28. The tongues 28 and grooves 29 are machined to provide a clearance 37 between the sides of the tongues 28 and the grooves 29. Thus, the fit of the grooves 29 on the tongues 28 is loose permitting play between the die 10 and the chuck 11.

The tongues 28 divide the end surface 27 into two symmetrical sectors 30 and 31. In each of the sectors 30 and 31 the head 21 has channels 32 to receive gripping members 33 which are diametrically positioned on the head 21. As shown in the plan view of Fig. 3 each gripping member 33 is a long flat piece of resilient metal extending from the back of the threaded portion 18 out over the end 27 and engaging the cylindrical surface 35 of lower portion 34 of the die 10. The members 33 seat in the channels 32 and are tightly fastened at the rear end or away from the die by machine screws 36. The channels 32 are cut in the head 21 so that the minimum dimension $a$ in Fig. 1 between the opposed channels is less than the over-all diameter of the lower portion of the die 10 when the die 10 is seated on the end 27, the lower portion 35 fits tightly between members 33 and between the tongues 28 and the members 33. As shown in Fig. 4 the flat member 33 forms a tangential contact with the surface 35 at 38 and the curvature of the cylindrical surface 35 provides clearances 39 between the member 33 and the surface 35.

In operation when a die is to be replaced on the chuck 11 the retaining cap 12 is removed and the die to be replaced is removed. The new die is then positioned on the end 27. The members 33 spread slightly to receive the slightly larger lower portion 34 of the die and because of the resilience of the members 33 they hold the die in place on the end 27 until the retaining cap has been screwed into position with the annular portion 13 bearing against the lands of the die 10. The die 10 though held snugly between the members 33 is easily inserted because of the clearances 39 provided on each side of the areas of contact 38 between the members 33 and the surface 35. The clearances 39 permit the die 10 to slip into position on the surface 27 and not catch on the edges of the members 33.

The chuck and die are then ready for the cutting operation intended and the retaining cap 12 takes up the thrust on the die 10 during the cutting operation. Thus, the members 33 are not subject to stress and wear during the cutting operation and the only wear and stress that the members 33 are subjected to is the rubbing against the lower portion 34 and the slight flexing of the members 33 which occur during the removal and replacement of the die on the end 27. Consequently, the wear between the members 33 and the dies 10 is extremely small. Also the displacement of the resilient member 33 by placing a die 10 on the end 27 is small in comparison with the overall length of the member 33 and consequently the strain of the flexing of the member 33 is slight.

When a die is being replaced on a chuck it is of advantage to avoid the inconvenience and delay cause by the recovery and replacement of the die falling from the chuck after being placed in position and before the screwing on of the retaining cap. Also with the members 33 of this invention a die or other tool may be placed in position on a chuck in which the end 27 is pointed downward. Another advantage derived from this invention is the elimination of the necessity of holding the die or other tool in place on a tilted end of the chuck while the retaining cap is being screwed into position.

While the described arrangement has referred particularly to holding a die in a chuck it will be apparent that the features may be applied to a chuck holding other tools without departing from the scope of the invention as set forth in the claims.

I claim:

1. In a tool chuck a shank having a threaded head portion with an annular end surface for receiving a transversely grooved end surface of a generally cylindrical tool and having alined projections adapted to fit endwise into the groove in said tool, a pair of oppositely positioned longitudinal channels in the threaded periphery of said head portion evenly spaced between said projections, gripping members fastened in said channels and having ends protruding outward from said annular end surface and spaced apart a distance less than the diameter of the tool so as to be engaged and slightly flexed by the periphery of said tool as it is slid sidewise over said projections, and a cap threaded on said head surrounding said gripping members and adapted to engage said tool and adjust it to a precisely centered seat on said annular end surface with corresponding flexure of said gripping members in the final set position of the tool in the chuck.

2. A tool chuck as set forth in claim 1 in which the bottoms of the channels are transversely spaced apart a distance less than the over-all diameter of the portion of the tool engaged by said gripping members.

EARL R. KOONZ.

REFERENCES CITED

The following references are of record in the file of this patent:

UNITED STATES PATENTS

| Number | Name | Date |
|---|---|---|
| 921,977 | Goodrich | May 18, 1909 |
| 1,992,474 | Currier | Feb. 26, 1935 |
| 2,063,980 | Bruce | Dec. 15, 1936 |
| 2,441,472 | D'Ava | May 11, 1948 |

FOREIGN PATENTS

| Number | Country | Date |
|---|---|---|
| 609,194 | France | May 8, 1926 |